(12) United States Patent
Agrawal et al.

(10) Patent No.: US 9,729,661 B2
(45) Date of Patent: Aug. 8, 2017

(54) OPTIMIZATION OF MOBILE DATA COMMUNICATION USING BYTE CACHING

(71) Applicant: International Business Machines Corporation, Armonk, NY (US)

(72) Inventors: Dakshi Agrawal, Yorktwon Heights, NY (US); Victor S. Moore, Boca Raton, FL (US); Robert B. Nicholson, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 123 days.

(21) Appl. No.: 14/384,778

(22) PCT Filed: Feb. 5, 2013

(86) PCT No.: PCT/IB2013/050957
§ 371 (c)(1),
(2) Date: Sep. 12, 2014

(87) PCT Pub. No.: WO2013/136198
PCT Pub. Date: Sep. 19, 2013

(65) Prior Publication Data
US 2015/0029940 A1    Jan. 29, 2015

(30) Foreign Application Priority Data

Mar. 13, 2012   (GB) .................................. 1204363.4

(51) Int. Cl.
*H04L 29/08*   (2006.01)
*H04W 4/18*    (2009.01)
(Continued)

(52) U.S. Cl.
CPC ........... *H04L 67/2842* (2013.01); *H04W 4/18* (2013.01); *H04W 8/02* (2013.01);
(Continued)

(58) Field of Classification Search
None
See application file for complete search history.

(56) References Cited

U.S. PATENT DOCUMENTS 6,775,692 B1 * 8/2004 Albert ...................... H04L 1/16
370/236
7,184,420 B2   2/2007 Son et al.
(Continued)

FOREIGN PATENT DOCUMENTS

EP    1039721 A2   9/2000
EP    1928154 A1   6/2008
(Continued)

OTHER PUBLICATIONS

Muthitacharoen et al., "A Low-bandwidth Network File System", MIT Laboratory for Computer Science and NYU Department of Computer Science, 14 pages. http://citeseer.xist.psu.edu/viewdoc/download doi=10.1.1.21.4536&rep=rep1&type=pdf.
(Continued)

*Primary Examiner* — Anh-Vu Ly
*Assistant Examiner* — Hector Reyes Ortiz
(74) *Attorney, Agent, or Firm* — Mark G. Edwards

(57) ABSTRACT

Method and system are provided for optimization of mobile data communication using byte caching. The method includes: intercepting data communications at a base station, wherein the data communications are between a user equipment and a network; and implementing byte caching at the base station to optimize data transfer between the base station and a byte cache server in the network at a peering point; wherein the network containing the base station supports mobility management of data transfer to and from the user equipment. The method includes providing a byte (Continued)

cache server as a transparent proxy with byte caching functionality where traffic for the user equipment is no longer tunnelled.

20 Claims, 11 Drawing Sheets

(51) Int. Cl.
*H04W 8/02* (2009.01)
*H04W 28/02* (2009.01)
*H04W 28/06* (2009.01)
*H04W 88/00* (2009.01)

(52) U.S. Cl.
CPC ..... *H04W 28/0226* (2013.01); *H04W 28/065* (2013.01); *H04W 88/005* (2013.01)

(56) References Cited

U.S. PATENT DOCUMENTS

| | | | |
|---|---|---|---|
| 8,060,656 | B2 | 11/2011 | Hanson et al. |
| 8,837,318 | B2 | 9/2014 | Anthony, Jr. et al. |
| 9,014,023 | B2 | 4/2015 | Anthony, Jr. et al. |
| 2005/0141455 | A1 | 6/2005 | Kim et al. |
| 2007/0245090 | A1* | 10/2007 | King ............... G06F 12/0813 711/129 |
| 2008/0025216 | A1 | 1/2008 | Singh et al. |
| 2008/0153460 | A1 | 6/2008 | Chan et al. |
| 2008/0307219 | A1 | 12/2008 | Karandikar |
| 2008/0310365 | A1 | 12/2008 | Ergen et al. |
| 2010/0034089 | A1 | 2/2010 | Kovvali et al. |
| 2010/0054261 | A1* | 3/2010 | Somech ............. H04L 12/2602 370/400 |
| 2010/0241694 | A1* | 9/2010 | Jensen .................. H04L 69/24 709/203 |
| 2010/0318632 | A1 | 12/2010 | Yoo et al. |
| 2011/0013631 | A1 | 1/2011 | Frydman et al. |
| 2011/0064055 | A1 | 3/2011 | Jang et al. |
| 2011/0173209 | A1 | 7/2011 | Fortier |
| 2011/0202634 | A1 | 8/2011 | Kovvali et al. |
| 2011/0218969 | A1 | 9/2011 | Anglin et al. |
| 2011/0225312 | A1 | 9/2011 | Liu et al. |
| 2011/0274042 | A1 | 11/2011 | Diachina et al. |
| 2012/0102140 | A1* | 4/2012 | Nadas ............... H04L 43/0888 709/213 |
| 2012/0198032 | A1* | 8/2012 | Fitzgerald ............... H04W 4/00 709/219 |
| 2012/0290790 | A1* | 11/2012 | Meirosu ................ G06F 12/121 711/118 |
| 2014/0051445 | A1* | 2/2014 | Vikberg ................ H04W 36/02 455/436 |

FOREIGN PATENT DOCUMENTS

| | | |
|---|---|---|
| GB | 2500374 A | 9/2013 |
| WO | 0116788 A2 | 3/2001 |
| WO | 2004057437 A2 | 7/2004 |
| WO | WO2009108723 A2 | 9/2009 |
| WO | 2009142685 A1 | 11/2009 |
| WO | 2010151193 A1 | 12/2010 |
| WO | 2011075019 A1 | 6/2011 |
| WO | 2011116819 A1 | 9/2011 |
| WO | 2012009619 A2 | 1/2012 |
| WO | WO2013136198 A1 | 9/2013 |

OTHER PUBLICATIONS

Rabin, M., "Fingerprinting by Random Polynomials", Department of Mathematics, The Hebrew University of Jerusalem, Department of Computer Science Harvard University, Tech Report TR-CSE-03-01, 14 pages.
Unknown, "Example Domain", 1 page. Last printed on Jan. 25, 2016. http://www.example.com/examplelargefflle.doc.
Unknown, "Example Domain", 1 page. Last printed on Jan. 25, 2016. http://www.example.com/.
Unknown, "Rabin fingerprint", Wikipedia, The Free Encyclopedia, 2 pages. Last printed on Jan. 25, 2016. https://en.wikipedia.org/wiki/Rabin_fingerprint.
Patents Act 1977: Examination Report under Section 17(5), dated Jul. 11, 2012, Application No. GB1204363.4, 8 pages.
Patents Act 1977: Examination Report under Section 18(4), dated Feb. 26, 2015, Application No. GB1414513.0, 1 page.
International Search Report and Written Opinion, dated Jul. 4, 2013, regarding Application No. PCT/IB2013/050957, 8 pages.
Veloso et al., "Seamless Mobility of Users with QoS and Connectivity Support," Proceedings of the Third IEEE International Conference on Wireless and Mobile Computing, Networking and Communications (WiMOB 2007), Oct. 2007, 8 pages.
Wang et al., "Proxy caching for wireless multimedia streaming (Abstract only)," Proceedings of the 2005 International Conference on Wireless Networks, Communication and Mobile Computing, vol. 2, Jun. 2005, 1 page.

* cited by examiner

OPTIMIZATION OF MOBILE DATA COMMUNICATION USING BYTE CACHING

CROSS-REFERENCE TO RELATED APPLICATIONS

This application claims priority under 35 U.S.C. §371 to International Application No. PCT/IB2013/050957 filed Feb. 5, 2013, which claims priority to United Kingdom Patent Application No. GB 1204363.4, filed Mar. 13, 2012. The contents of both aforementioned applications are incorporated herein by reference.

TECHNICAL FIELD

This invention relates to the field of optimization of mobile data communication with mobility management. In particular, the invention relates to optimization of mobile communication with mobility management using byte caching.

BACKGROUND ART

A wireless mobile data terminal (the User Equipment (UE)) communicates with a server on a connected fixed network. A mobile data terminal may be any device that can send data over a wireless network where the network provides mobility management. Examples of networks include: the GPRS (General packet radio service) (2G) network; the WCDMA (Wideband Code Division Multiple Access) (3G) network; or the LTE (Long Term Evolution) or WiMAX (Worldwide Interoperability for Microwave Access) (4G) network. The background and description of the invention are described in terms of the $3^{rd}$ Generation Mobile Phone Network, UMTS (Unified Mobile Telephony System)/WCDMA.

Referring to FIG. 1, a schematic diagram shows the UMTS architecture 100 which is standardized by the 3rd Generation Partnership Project (3GPP).

The wireless device (cell phone, 3G dongle for a laptop, tablet device, etc.) is known in 3GPP terminology as a User Equipment (UE) 101. It connects wirelessly 110 to the base station which is labelled Base Station (BS) 102 and is known as a Node B in 3GPP terminology. Around 100 Node Bs are connected over microwave or optical fiber 120 to a Radio Network Controller (RNC) 103 which is connected back to a Serving GPRS Support Node (SGSN) 104 (which supports several RNCs) and then a Gateway GPRS Support Node (GGSN) 105. Finally the GGSN is connected back to the operators' service network (OSN) 10 which connects to the Internet 107 at a peering point.

The protocols between the cell phone back to the GGSN are various 3GPP specific protocols over which the IP traffic from the UE is tunnelled. Between the RNC 103 and the GGSN 105 a GPRS tunnelling protocol (GTP) 130 is used. Between the GGSN 105, OSN 106 and the Internet 107, standard Internet Protocol (IP) 140 is used. Note that the OSN 106 is termed the "Gi" reference point in the 3GPP terminology.

A key problem with communication via mobile networks is the rapid increase of data traffic. The density of mobile computing platforms is increasing at an exponential rate. Mobile computing platforms include traditional platforms such as phones, tablets and mobile broadband enabled laptops but increasingly also include mobile data enabled devices, such as GPS systems, cars, even mobile medical equipment. This exponential increase brings significant new challenges for Mobile Network Operators (MNOs) as data becomes the majority of the content they deliver. Specifically, although additional base stations are fairly easy to deploy to increase the available aggregate "air interface" bandwidth, the connections back from the base stations to the RNC, typically implemented as microwave links, are bandwidth constrained. Upgrading them to fiber optic connections is very expensive. Similarly increasing the available bandwidth in the RNC and core network is expensive.

BACKGROUND

Mobile Internet Optimization

One technique to address this is to "break out" the data traffic out of the mobile phone protocols and optimize it. Several companies market devices designed to break data traffic out of the network. Examples include the Mobile Data Offload "MDO" product from Stoke, Inc. and the Internet Offload appliance marketed by Continuous Computing. Each of these examples breaks traffic out of the 3GPP protocols at the RNC. Similar technology is emerging to break out the IP traffic at the base station.

Once the IP traffic has been broken out of the network, it is possible to put an optimization platform at the edge of the mobile phone network, either at the RNC or in the base station. This platform can host various optimization and other applications.

Umts Mobility Management

Referring to FIGS. 2A to 2C, a series of schematic block diagrams illustrate a network architecture 200 with mobility management as a user equipment (UE) 201 moves at the edge of the network. The figures show four base stations 211-214 named Node Bs. Sub-sets of base stations 211-212, 213-214 communicate with individual RNCs 221, 222. This communication is referred to as a backhaul link 231, 232 between the base stations and the core of the telephone company's network. The RNCs 221, 222 communicate with a SGSN 241 which uses a GGSN 251 which connects to the Internet 260 which includes multiple servers, such as the shown server 261. The server 261 has a TCP (Transmission Control Protocol) socket 262 which communicates with a TCP socket 202 at the UE 201 when a user wishes to access data from the server 261. In FIGS. 2A to 2C, the data transfer is shown in solid straight arrows, and the signalling control is shown as curved hashed arrows.

As mentioned earlier, the UMTS system makes a tunnel 270 from the GGSN 251 to the user equipment (UE) 201. In FIG. 2A, the UE 201 is communicating with base station Node B 1 211 as the user is closest to this base station. The IP tunnel 270 is shown for user traffic. The IP tunnel 270 is shown for illustration purposes in FIGS. 2a to 2C and in practice passes through the interim components, such as the RNC 221 and the SGSN 241 in FIG. 2A.

As the UE 201 begins to move from one cell to the next, the RNC 221 detects movement of the UE 201 and starts a mobility event and works with the GSNs 251, 261 (GPRS Support Nodes) to move the tunnel 270 as the UE 201 moves from base station 211 to base station 212.

FIG. 2B shows the UE 201 moved to base station Node B 2 212 and the tunnel 270 moved correspondingly.

FIG. 2C shows the UE 201 moved to base station Node B 3 213 causing inter-RNC mobility as the UE 201 moves from a base stations with first RNC 1 221 to a base station with second RNC 2 222 with the tunnel 270 moved accordingly.

The key point is that the UMTS system maintains the integrity of the tunnel 270 across the mobility event. The TCP connections flowing through the tunnel 270 are not broken. It is possible that one or more IP packets may be dropped during the mobility event but TCP is designed to operate over lossy links and so this packet drop can be easily recovered.

As the UE continues to move into an area served by a new RNC 222, the tunnel 270 is handed off seamlessly from one RNC 221 to another 222.

Byte Caching

Byte caching is a term given to a particular optimization technique typically used on point to point links. The technique is known by many other terms. Briefly, byte caching works by examining the traffic flowing over a link and replacing sequences of bytes with tokens which refer back to a previous case where the same set of bytes were transferred in the past. This technique works well because long sequences of bytes are often repeated in data traffic. One example is when multiple versions of a file are transferred over a link, another is when emails are sent back and forth with edits.

It is important for success that the offset and length of the chunks in the data stream is not defined in a fixed way because fixed chunk boundaries would be defeated by a small insertion or deletion in a file which would shift the remainder of the data. Instead, chunk boundaries are defined by the content of the file using Rabin Fingerprints, see Michael O. Rabin (1981) "Fingerprinting by Random Polynomials", Center for Research in Computing Technology, Harvard University. Tech Report TR-CSE-03-01, Retrieved 2007 Mar. 22.

The byte caching technique is described in the paper "A Low-bandwidth Network File System" by Athicha Muthitacharoen, Benjie Chen, and David Mazieres, MIT Laboratory for Computer Science and NYU Department of Computer Science.

TCP (Transmission Control Protocol)

TCP creates a reliable connection between two endpoints (sockets). A state machine is provided in each socket and the connection state is interlocked by messages. Retransmission and pacing relies on sequence numbers. TCP sockets must keep track of sequence numbers sent and received and acknowledge data. TCP sockets know the IP address and port that they receive packets from (Network address translation may maintain a mapping to the real IP and port). Sockets expect to be able to contact their peer at this IP and port, and expect their peer to keep a synchronized version of the state.

Existing Traffic Optimization Solutions Using Byte Caching

US2011/0173209 describes a system that optimizes all the traffic across a particular point to point backhaul link from the RNC to a particular Node B.

The various WAN optimization vendors make products that include byte caching. They have clients that can be installed onto a mobile device. In this case, the client has to be on the mobile device.

There is a need in the art to address data optimization across the whole mobile access network and core rather than just across the backhaul, that is to say back to the peering point with the Internet, known as the Gi. In particular, a problem arises when a client cannot be loaded onto a UE. The optimization not impact mobility including mobility to parts of the network which do not have the optimization present in the base station.

SUMMARY OF INVENTION

According to a first aspect of the present invention there is provided a method for optimization of mobile data communication, comprising: intercepting data communications at a base station, wherein the data communications are between a user equipment and a network; implementing byte caching at the base station to optimize data transfer between the base station and a byte cache server in the network at a peering point; wherein the network containing the base station supports mobility management of data transfer to and from the user equipment.

According to a second aspect of the present invention there is provided a system for optimization of mobile data communication, comprising: a processor; a network containing one or more base stations, wherein the network supports mobility management of data transfer to and from a user equipment; a byte cache component for intercepting at a base station data communications between a user equipment and the network and for implementing byte caching at the base station; a byte cache server in the network at a peering point for byte caching data; wherein data transfer between the base station and a byte cache server are optimized using byte caching.

According to a third aspect of the present invention there is provided a computer program stored on a computer readable medium and loadable into the internal memory of a digital computer, comprising software code portions, when said program is run on a computer, for performing the method of the first aspect of the present invention.

BRIEF DESCRIPTION OF THE DRAWINGS

The present invention will now be described, by way of example only, with reference to preferred embodiments, as illustrated in the following figures.

Figure 1:
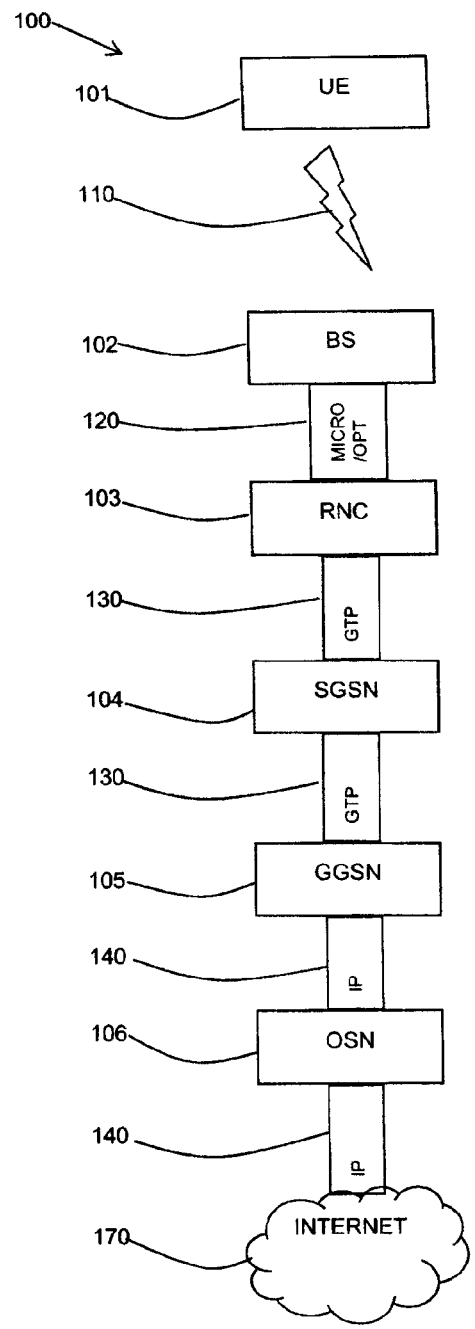
FIG. 1 is a schematic diagram showing a mobile network architecture, in accordance with the prior art, and in which a preferred embodiment of the present invention may be implemented.
Figure 2A:
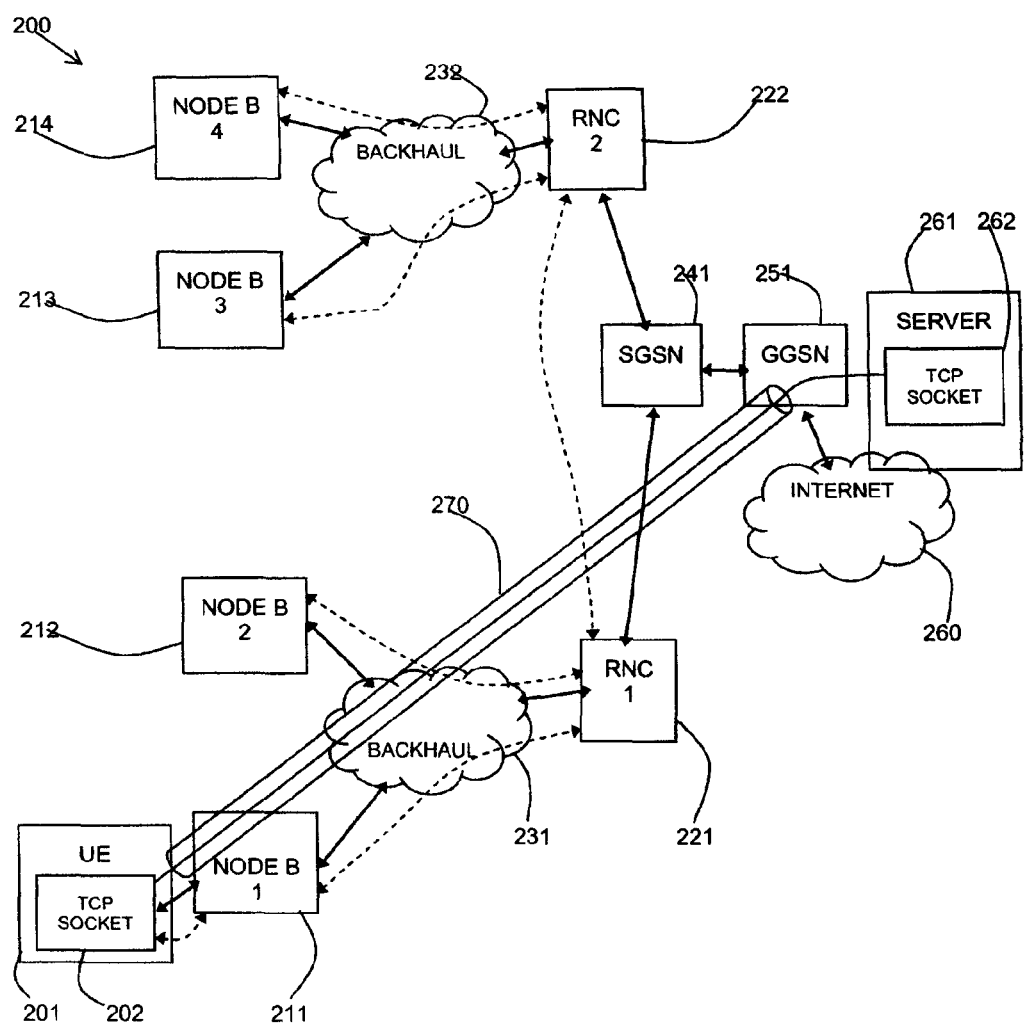
FIGS. 2A to 2C are schematic block diagrams showing mobile management across a mobile network, in accordance with the prior art, and in which a preferred embodiment of the present invention may be implemented.
Figure 2B:
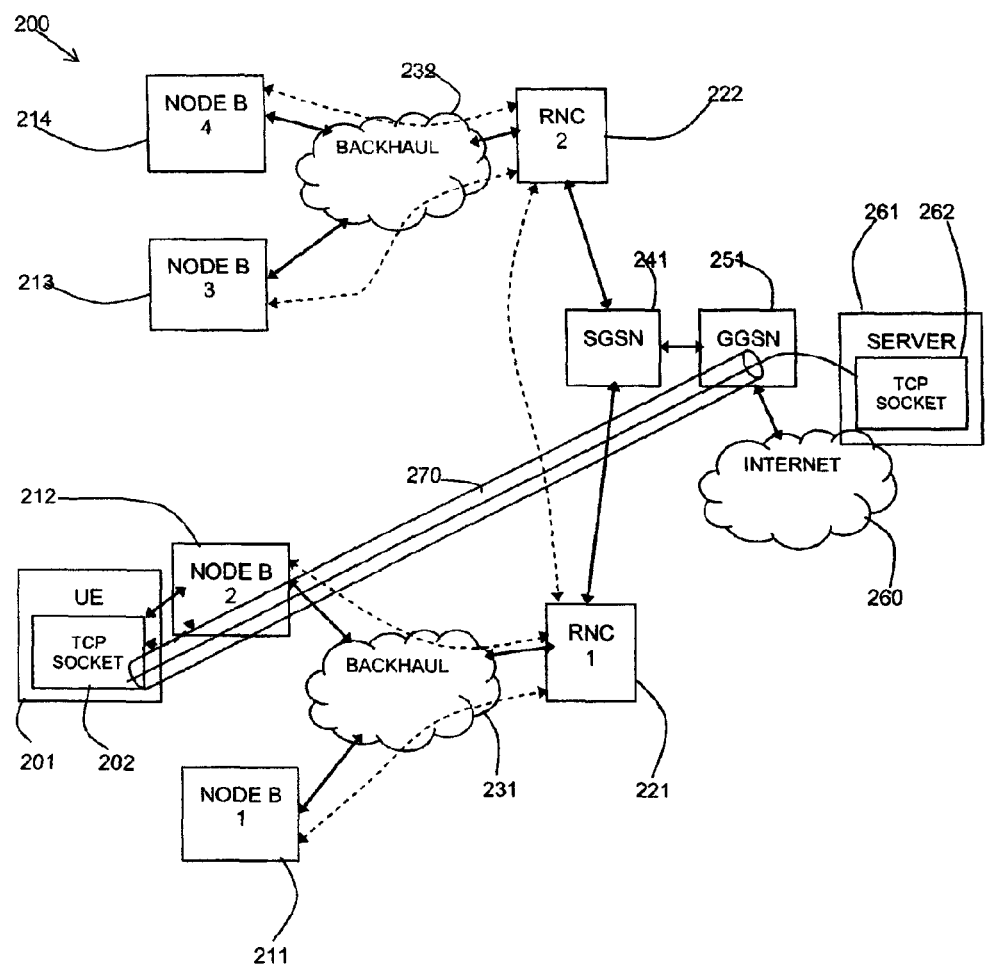
Figure 2C:
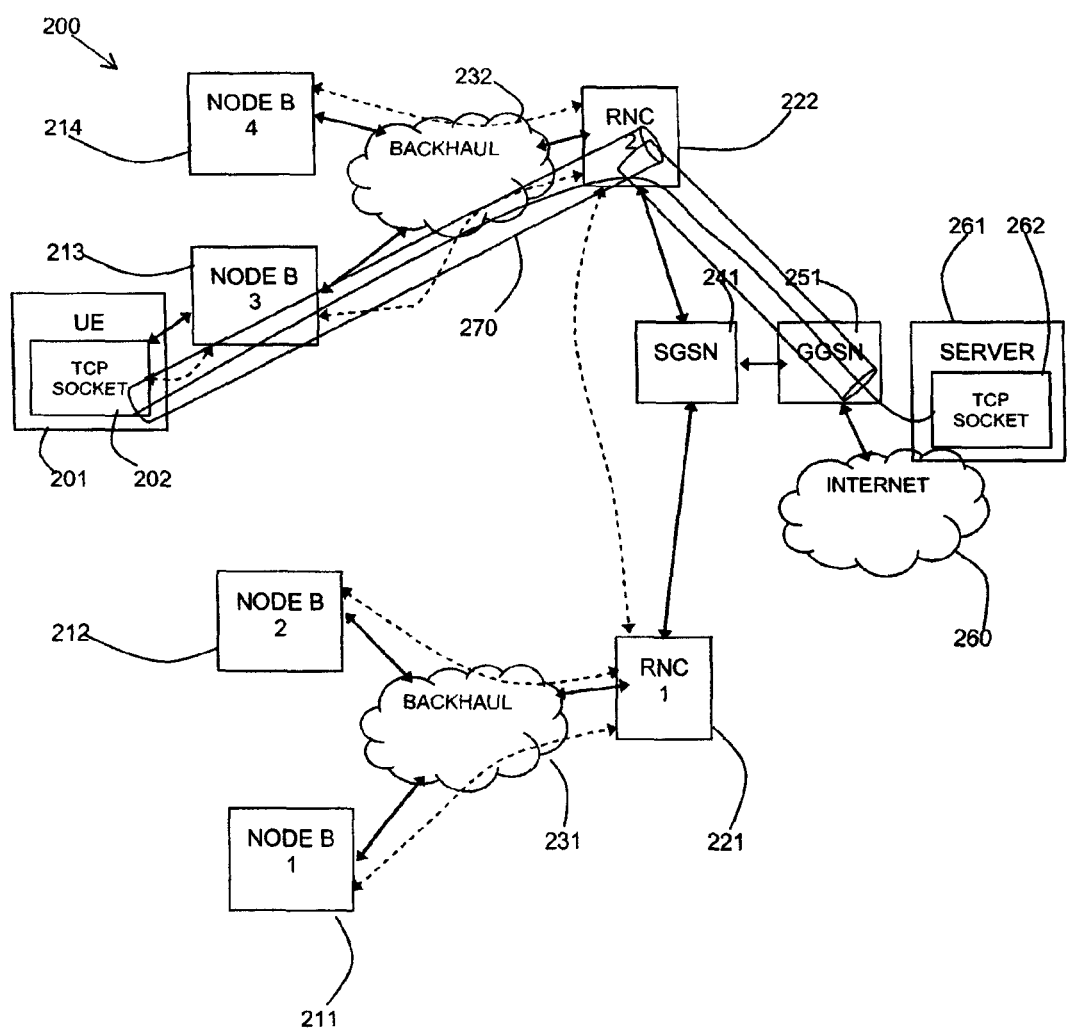

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Method and system are described for optimizing communication between a wireless mobile data terminal (the User Equipment (UE)) and a server on a connected fixed network. The mobile data terminal may be any device that can send data over a wireless network where the network provides mobility management. Example networks include the GPRS (2G) network, the WCDMA (3G) network, or the LTE or WiMAX (4G) network. However, for the purposes of this description the 3G UMTS/WCDMA network will be used.

The particular optimization described is one which: reduces the volume of data sent over the backhaul of the Radio Access Network (RAN), does not require any modification to the UE hardware or software nor to the server, and does not interfere with mobility management.

In the described solution, byte caching is implemented between a central interception server in the Gi and a set of interception functions in a subset of the base stations. The implementation intercepts, but does not terminate, transfer protocol connections. It optimizes transfer protocol connections when they flow through a base station which has the optimization function. If the UE moves to another base station which has the optimization function, then optimization continues. If the UE moves to a base station that does not have the optimization function, then the transfer protocol connection is not affected but is not optimized.

The solution is described for transfer protocol connections in the form of TCP connections but may be trivially extended to other layer 4 protocols, such as User Datagram Protocol (UDP) and Stream Control Transmission Protocol (SCTP). The term transfer protocol is used to encompass all such protocols.

A byte caching server is inserted into the UMTS network at the reference point called the "Gi". This server is referred to as a "BCGi" (Byte Cache Gi). At the Gi, traffic is no longer tunnelled. The Gi is much like a conventional WAN, it is the place where the connection is made to the peering point with the Internet. This BCGi component operates as a conventional transparent TCP proxy but has additional byte caching behavior that will be described.

Some or all of the base stations are augmented with a breakout and byte cache component. The details of breakout itself are not described as they are prior art. The focus of the described solution is the optimization and how the transfer protocol connection is managed. The breakout and byte caching component at a base station is referred to as a "BCNB" (Byte cache Node B). As far as the user plane data is concerned, the BCNB function operates as a "bump in the wire". It is not a proxy. The transfer protocol connection between the UE and the core is not terminated but it is sometimes manipulated by the BCNB as if it were terminating it, as will be described.

Figure 3:
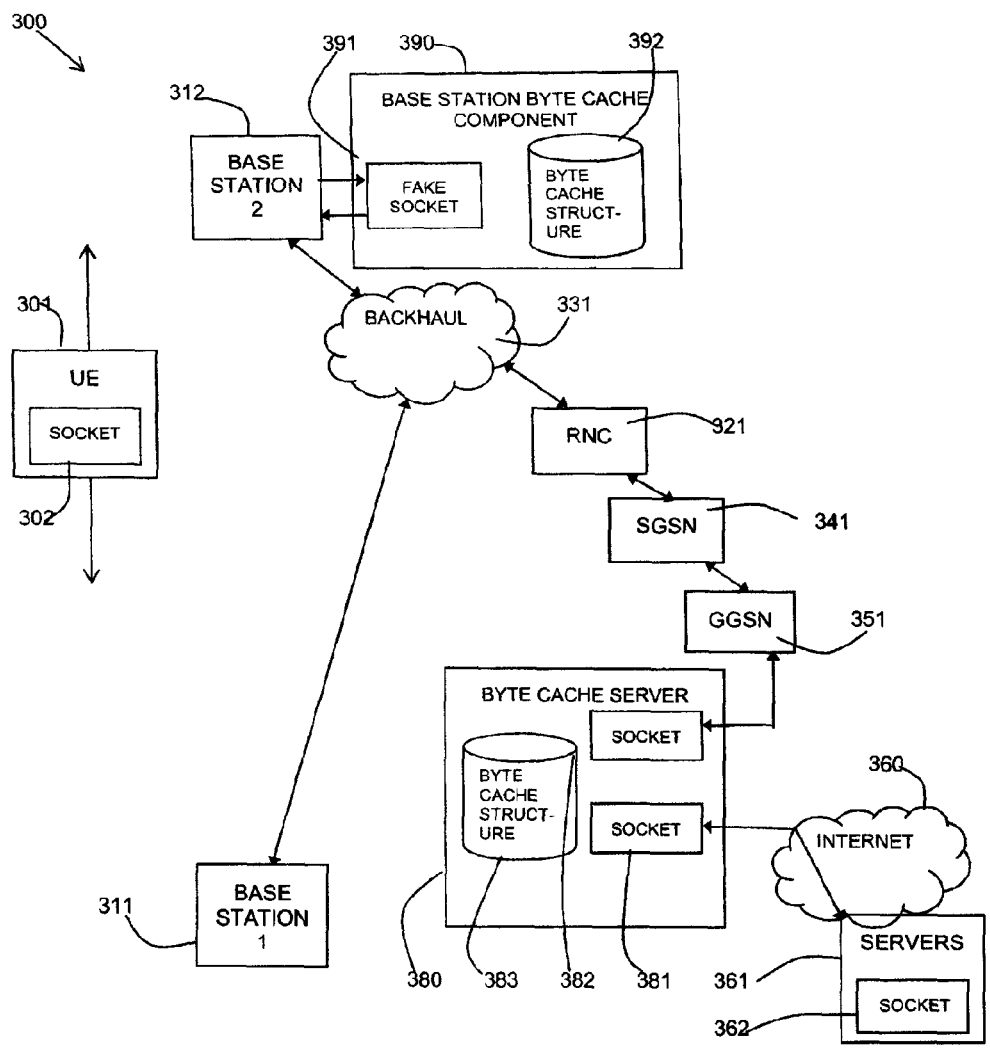
FIG. 3 is a block diagram of a system, in accordance with a preferred embodiment of the present invention.

Referring to FIG. 3, a block diagram shows an example embodiment of the described system 300.

A user equipment (UE) 301 moves at the edge of the network between multiple base stations (only two are shown in this example) 311-312, these are referred to as Node Bs in 3G terminology. The UE 301 has a transfer protocol socket 302 for data transmission to and from a socket 362 of a server 361 on the Internet 360.

The base stations 311-312 communicate with an RNC 321. This communication is referred to as a backhaul link 331 between the base stations and the core of the telephone company's network. The RNC 321 communicates with a SGSN 341 which in turn communicates with a GGSN 351.

The described system includes a byte cache server 380, referred to herein as a byte cache Gi (BCGI), at the point where the network connects to the peering point with the Internet 360. The byte cache server 380 operates as a conventional transparent transfer protocol proxy but has additional byte caching behavior that will be described. The byte cache server 380 includes transfer protocol sockets 381, 382, and a byte cache structure 383.

The Internet 360 provides communication with multiple servers, such as the shown server 361. The server 361 has a transfer protocol socket 362.

In this embodiment, one of the base stations 312 includes a byte cache component 390 referred to as a byte cache Node B (BCNB) which includes breakout and byte cache functionality to optimize data transfer. This is not a proxy but manipulates the transfer protocol connection between the UE and the core as described further below. The byte cache component 390 includes a fake transfer protocol socket 391 and a byte cache structure 392.

An IP tunnel for user traffic is established between the UE 301 and the GGSN 351.

Figure 4:
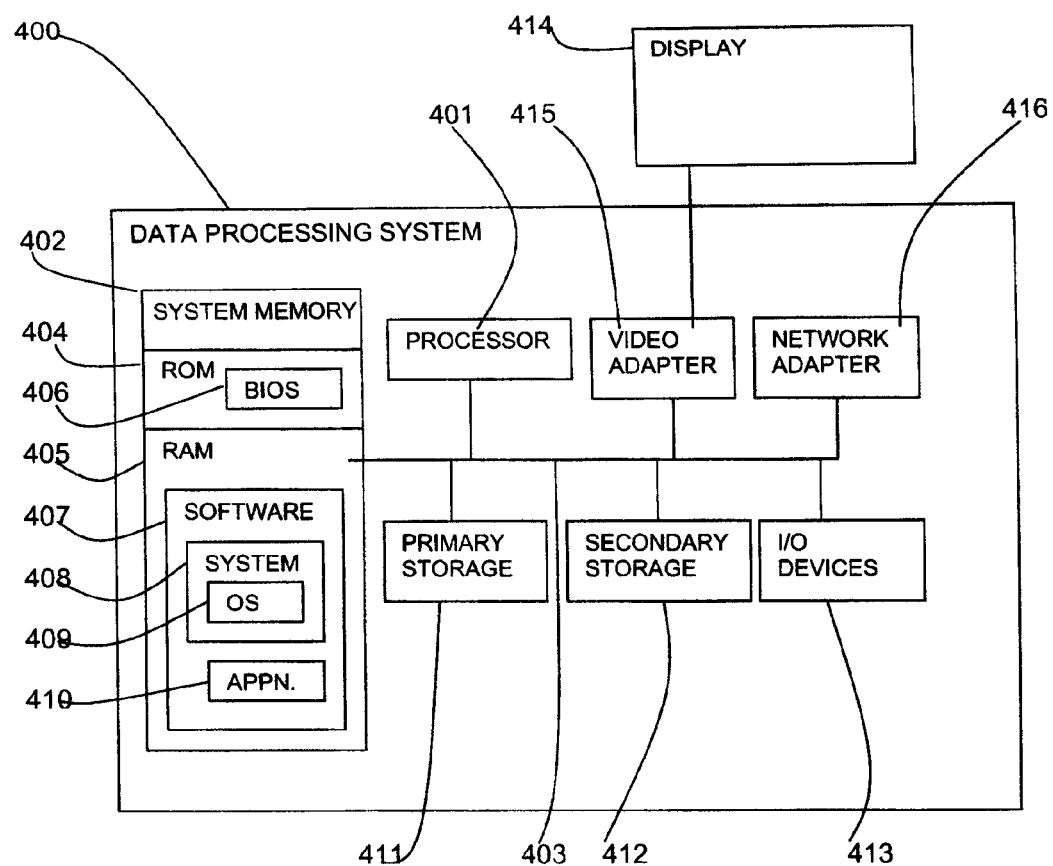
FIG. 4 is a block diagram of a computer system, in accordance with the prior art, and in which a preferred embodiment of the present invention may be implemented.

Referring to FIG. 4, an exemplary system for implementing aspects of the invention includes a data processing system 400 suitable for storing and/or executing program code including at least one processor 401 coupled directly or indirectly to memory elements through a bus system 403. The memory elements can include local memory employed during actual execution of the program code, bulk storage, and cache memories which provide temporary storage of at least some program code in order to reduce the number of times code must be retrieved from bulk storage during execution.

The memory elements may include system memory 402 in the form of read only memory (ROM) 404 and random access memory (RAM) 405. A basic input/output system (BIOS) 406 may be stored in ROM 404. System software 407 may be stored in RAM 405 including operating system software 408. Software applications 410 may also be stored in RAM 405.

The system 400 may also include a primary storage means 411 such as a magnetic hard disk drive and secondary storage means 412 such as a magnetic disc drive and an optical disc drive. The drives and their associated computer-readable media provide non-volatile storage of computer-executable instructions, data structures, program modules and other data for the system 400. Software applications may be stored on the primary and secondary storage means 411, 412 as well as the system memory 402.

The computing system 400 may operate in a networked environment using logical connections to one or more remote computers via a network adapter 416.

Input/output devices 413 can be coupled to the system either directly or through intervening I/O controllers. A user may enter commands and information into the system 400 through input devices such as a keyboard, pointing device, or other input devices (for example, microphone, joy stick, game pad, satellite dish, scanner, or the like). Output devices may include speakers, printers, etc. A display device 414 is also connected to system bus 403 via an interface, such as video adapter 415.

Figure 5:
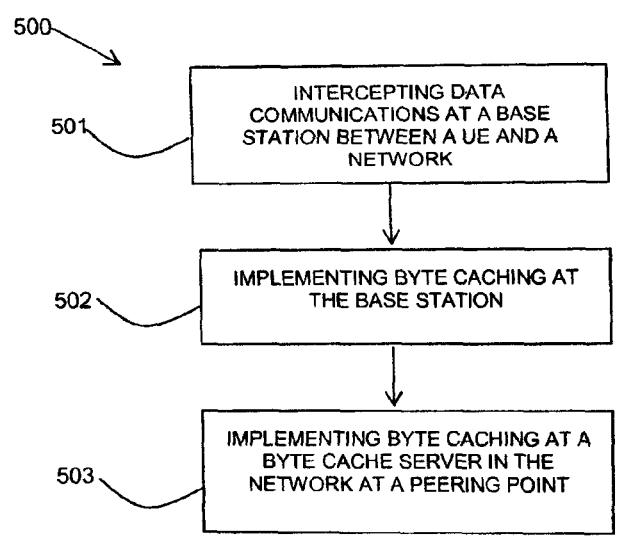
FIG. 5 is a flow diagram of an aspect of a method, in accordance with a preferred embodiment of the present invention.

Referring to FIG. 5, a flow diagram 500 shows an example embodiment of the described method. The method includes intercepting 501 data communications at a base station between a user equipment and a network. Byte caching is implemented 502 at the base station to optimize data transfer. Byte caching is also implemented 503 at a byte cache server provided in the network at a peering point.

An example scenario is now described in order to illustrate the described solution in more detail.

A scenario is described where a data session is first established by a UE which is using a Node B which does not have a BCNB. The UE then moves to (and is handed off to) a Node B which does have a BCNB. The scenario assumes that the UE is downloading a large file over HTTP from the URL http://www.example.com/examplelargefile.doc Ue Starts a Request Via a Node B With No BCNB Referring to FIG. 6, a flow diagram 600 shows an example embodiment of an aspect of the described method. An UE establishes 601 a tunnel with the network in the normal way. It makes a TCP connection 602 to a port at a server it wishes to receive data from, for example, port 80 on www.example.com. This TCP connection is transparently proxied 603 by the BCGi. Over the TCP connection the UE makes 604 a HTTP request. This request is propagated 605 unchanged to the server port, i.e. www.example.com port 80, by the transparent proxy in the BCGi.

The response from the server port flows back 606 through the proxy and is propagated back to the UE. The BCGi does not alter the TCP stream at all but does begin examining the data, calculating Rabin fingerprints and storing away chunks of the file in the byte cache together keyed on their SHA1 hash. The byte caching is not fully described here because it is well described in the prior art references. Suffice to say that the BCGi starts to populate 607 a standard byte cache structure but does nothing more until the UE moves to a Node B with a BCNB function.

Ue Moves to a Node B With a BCNB

Figure 7:
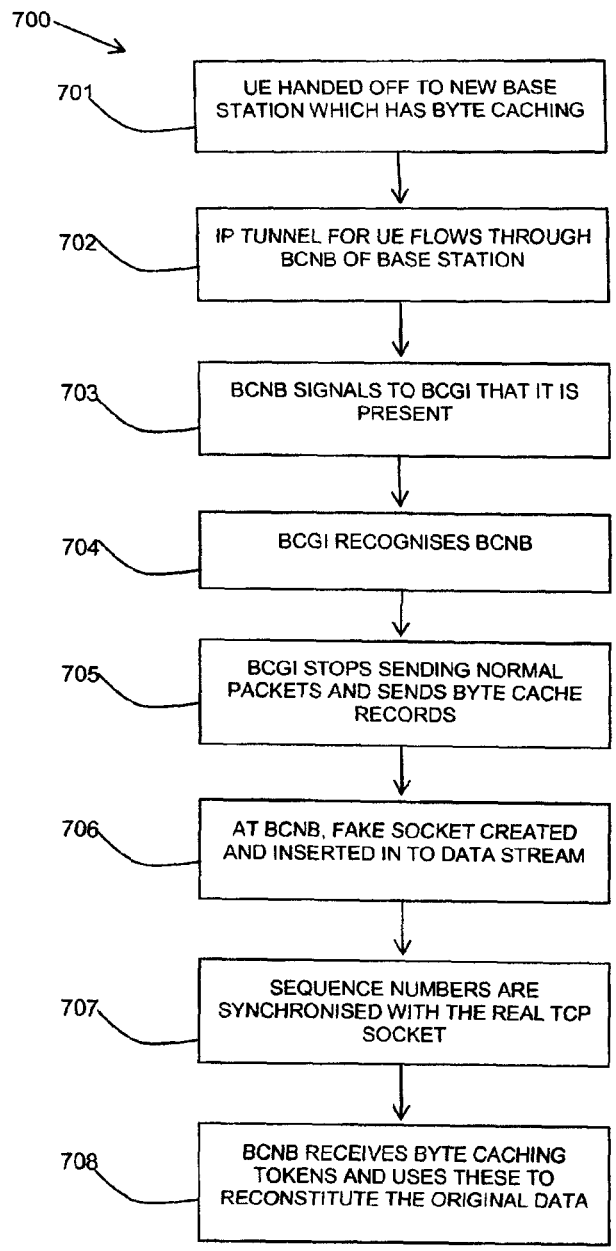
FIG. 7 is a flow diagram of an aspect of a method, in accordance with a preferred embodiment of the present invention.

Referring to FIG. 7, a flow diagram 700 shows an example embodiment of a further aspect of the described method. Via the standard normal mobility procedures of the UMTS the UE is handed off 701 to a new base station which has a BCNB. This means that the traffic can now be optimized using byte caching.

The IP tunnel for the UE begins to flow 702 through the BCNB function in the Node B. The BCNB signals 703 to the BCGi that it is present in the data path. In one embodiment, this signalling is provided by modifying the TCP header of the TCP packet to insert a marker TCP option into the options field in the TCP header. The BCGi intercepts these added TCP options, interprets and removes them. Alternative embodiments of this feature include sending marker IP datagrams or modifying the IP header of the TCP packets.

When the BCGi recognizes 704 that a BCNB is present in the data path, the BCGi stops sending normal TCP traffic and starts 705 instead to send "Byte Caching Records" (BCRs) for this traffic to the BCNB. To be precise, these records are sent through the GTP tunnel as if they were to be sent to the UE but they are not sent inside the TCP connection. Instead, they are sent over UDP to a port that the BCGi recognizes. There are in fact many ways that these records could be sent, UDP to a special port is one example.

The BCRs may contain:

All the TCP metadata to allow the TCP packets to which they relate to be recreated at BCGi;

The starting 32 bit sequence number from the TCP header;

A byte caching token which is essentially a key that represents a chunk of the data (typically in the region of 8K in size).

At the BCNB, a "Fake TCP Socket" is created 706. This fake socket mimics the behavior and the state that the real TCP socket in the BCGi has. The fake socket is inserted into the data stream in the ESTABLISHED TCP state. Its sequence numbers in both the send and receive direction are kept synchronized 707 with the real TCP socket.

The BCNB receives 708 the byte caching tokens from the BCGi and uses these tokens to reconstitute the original data. The details of reconstituting the original data are related to byte caching. Briefly, the byte cache at BCNB looks up the token in its cache to find the corresponding full data and reconstructs the TCP packets. What is critical is that the BCNB does not need to perform the expensive Rabin fingerprinting operations on the data, these can all be done at the BCGi. The BCNB simply accesses the data related to the token and recreates the TCP packets. The BCNB uses the data in the BCRs to reconstitute the TCP frames around the data fetched from the byte cache.

It is important to note that because the data in the TCP segments recreated from the BCRs is identical, byte for byte with the data that would have been sent by the BCGi had the BCNB not been present, the TCP state in the fake socket stays synchronized precisely with the BCGi.

Note also that there is no need for the byte caching to operate purely on a TCP segment by TCP segment basis. The BCRs can contain tokens that match several segments worth of TCP data. Indeed, the byte caching boundaries do not have to fall on segment boundaries.

Discussion on TCP Endpoint Management

With no BCNB in the path, there is a TCP connection between the TCP socket in the UE and the TCP socket in the TCP proxy in the BCGi.

When there is a BCNB in the path, the TCP connection between the UE and the BCGi still exists, but a fake TCP socket is created in the BCNB. This socket mimics the real socket in the BCGi.

The Fake socket in the BCNB is not a conventional TCP proxy because in a conventional TCP proxy the sequence numbers and state are not synchronized. The fake socket simply mimics the real socket. The fake socket may be removed when the session moves to a Node B with no BCNB function.

Discussion on Byte Caching in the Uplink Direction

In the simplest case, byte caching is not operable in the uplink direction. In this case, the fake TCP socket does not intercept uplink packets at all. These flow on to the real TCP socket in the BCGi. The real socket in the BCGi generates acknowledgements for packets received from the UE as normal.

The fake TCP socket at the BCNB communicates acknowledgement information back to the BCGi so that the BCGi knows which packets have been acknowledged by the UE. This is important so that the BCGi can continue to operate the TCP connection to the UE without errors if the UE moves to another Node B with or without a BCNB.

UE Moves to a Node B with No BCNB

Referring to FIG. 8, a flow diagram 800 shows an example embodiment of a further aspect of the described method. The example scenario is continued by assuming that the UE moves 801 to a Node B with no BCNB. The BCGi detects 802 that the session has moved. There are several ways that this can be achieved:

The UMTS system may be able to provide notification of mobility.

The BCNB and BCGi can exchange frequent heartbeats.

If the BCNB is not present in the data path to intercept the BCRs over UDP, then they will proceed on to the UE which will respond with an ICMP port unreachable error.

The BCGi can look for these ICMP port unreachable errors and react to them by understanding that the BCNB is no longer present.

When the BCGi detects that the session has moved, it responds 803 by resuming transmission of TCP packets from its socket as shown below.

Management of the Byte Cache at the BCNB

Further details of how the byte cache entries are managed are now given.

The BCNB receives tokens from the BCGi that looks these tokens up in a byte cache directory. The byte cache directory is conceptually a Hashmap of keys onto values where the key is the token and the value is the sequence of bytes which it represents.

There are multiple different ways to manage this cache. One way to manage it is for the BCGi to mirror the cache management algorithms at each of its BCNBs so that it knows precisely which tokens are present in each BCNB and for the BCGi to only send tokens to a particular BCNB when it knows that the token is present in the BCNB cache. In this case, when a chunk of data travels across the link which is not represented by a token known to be in the BCNB's cache, then the BCGi sends the bytes in the chunk to the BCNB together with its token.

An alternative way to manage the cache is for the BCGi to be unaware of the contents of the cache at the BCNB and for the BCNB to simply request the data for tokens where the token is not present in the cache at the BCNB.

SUMMARY

The proposed solution has been illustrated using an example showing how mobility operates in some scenarios. It should be understood that the described solution is also operable in a wide range of other cases including:

The TCP session is started on a Node B which has a BCNB function;

The TCP session moves from one BCNB enabled Node B to another; and

The TCP session moves from one non BCNB Node B to another non BCNB Node B.

Figure 6:
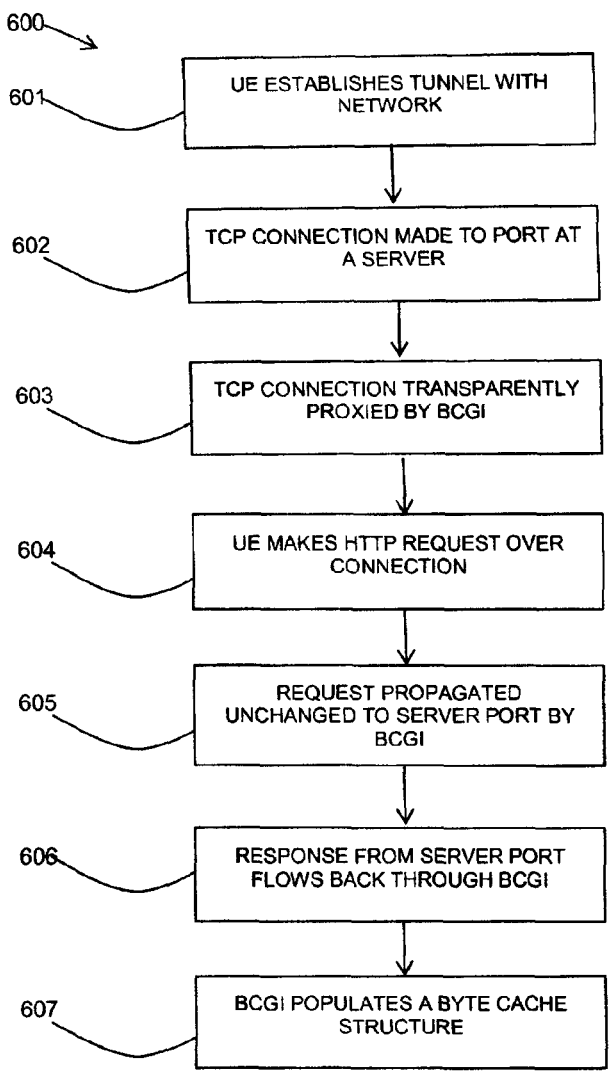
FIG. 6 is a flow diagram of an aspect of a method, in accordance with a preferred embodiment of the present invention.
Figure 8A:
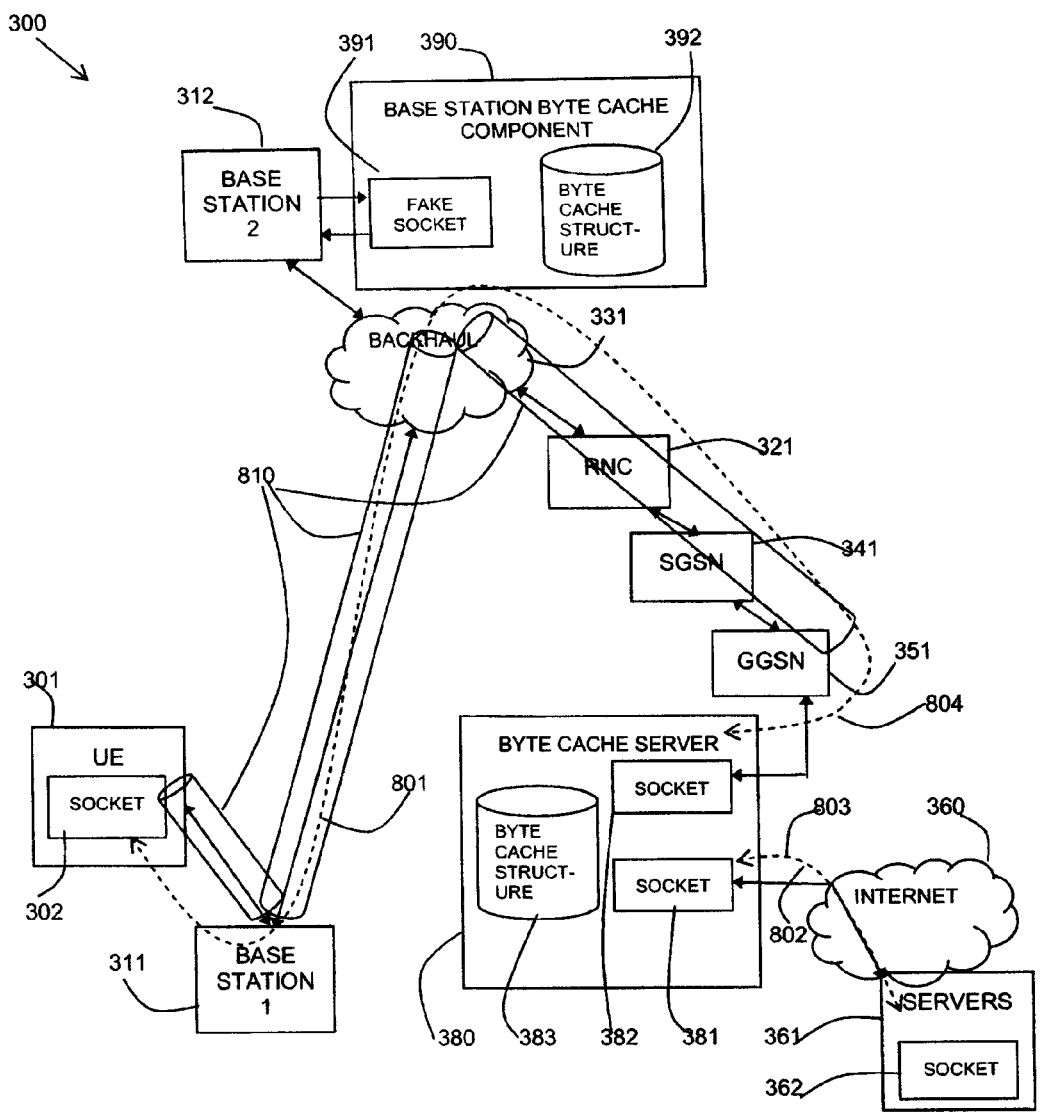
FIGS. 8A and 8B show the system of FIG. 3 with communication flows shown, in accordance with a preferred embodiment of the present invention.
Figure 8B:
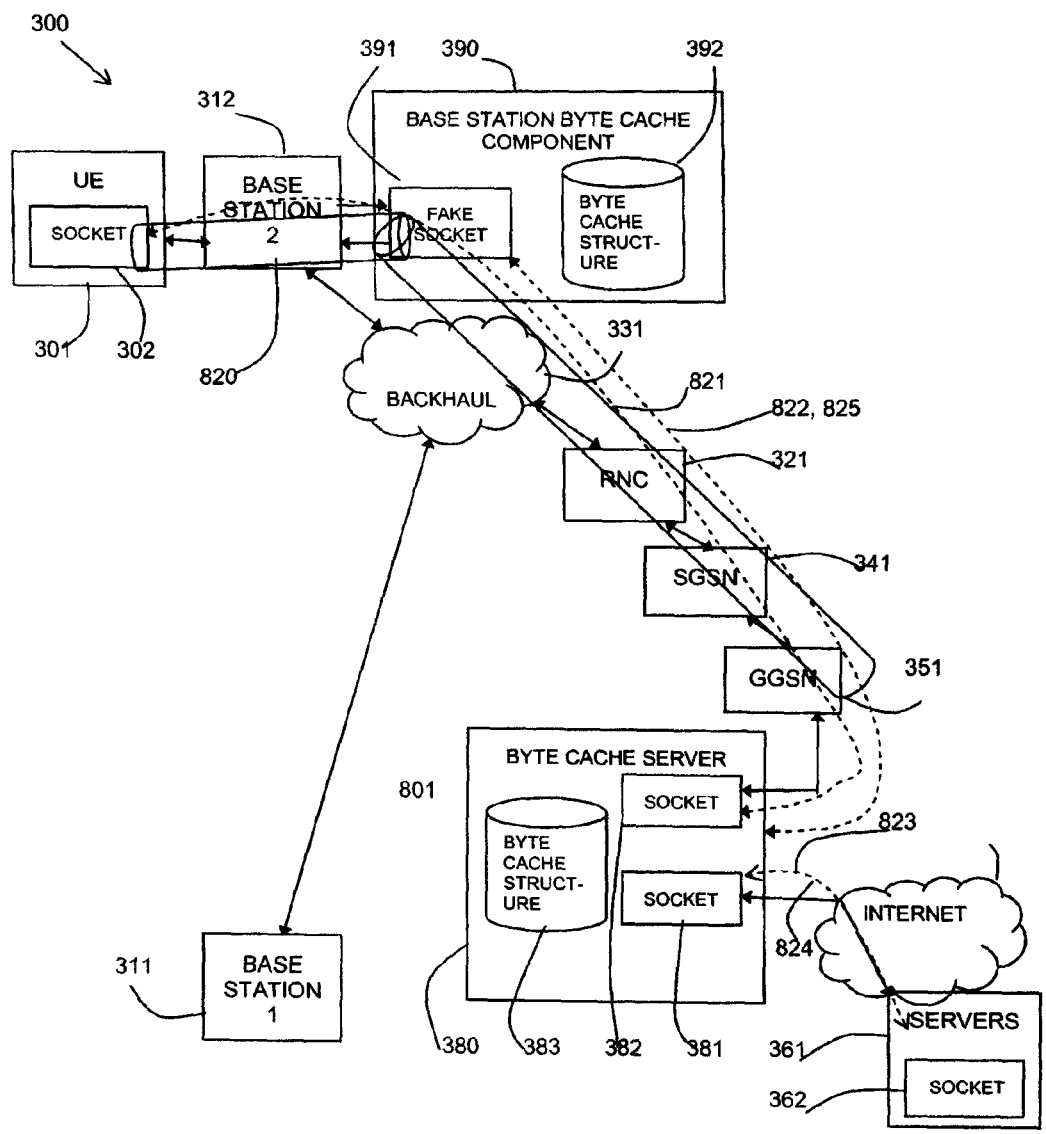

In FIGS. 8A and 8B, the scenarios of FIGS. 6 and 7 are illustrated in the context of the system of FIG. 3.

Referring to FIG. 8A, a UE 301 has a TCP socket 302 which communicates via a tunnel 810 with a GGSN 351. The UE 301 is currently in the area of base station Node B 1 321 which does not have a breakout and byte cache component 390.

A communication 801 is made from the TCP socket 302 of the UE 301 destined for a TCP socket 362 of an Internet server 361. The byte cache server 380 proxies the TCP connection by receiving the communication 801 at a TCP socket 381 and propagating a communication 802 from TCP socket 382 of the byte cache server 380 to the TCP socket 362 of the Internet server 361.

The response communication 803 from the TCP socket 362 of the server 361 flows back through the byte cache server 380 being received at TCP socket 382. The byte cache component 380 examines the data and caches bytes in a byte cache structure 383. A response communication 804 is then sent from the TCP socket 381 of the byte cache component 380 to the TCP socket 302 of the UE 301.

Referring to FIG. 8B, a UE 301 has a TCP socket 302 which communicates via a tunnel 820 with a GGSN 351. The UE 301 has moved to the area of base station Node B 2 322 which has a base station byte cache component 390.

A communication 821 is made from the TCP socket 302 of the UE 301 destined for a TCP socket 362 of an Internet server 361. The communication 821 is intercepted and flows through a fake socket of 391 of the byte cache component 390 of the base station Node B 2 322. The byte cache component 390 signals 822 to the byte cache server 380 that it is present in the path so that the byte cache server 380 can start to send byte caching records (BCRs) to the base station byte cache component 390.

The operation of the byte cache server 380 is as in FIG. 8A with communications 823, 824 to and from the TCP socket 362 of the Internet server 361.

The base station byte cache server 380 may then send a BCR communication 825 to the fake socket 391 of the base station byte cache component 390. The base station byte cache component 390 receives the BCRs from the byte cache server 380 and uses these tokens to reconstitute the original data.

The described solution enables byte caching to be carried out whilst supporting mobility management. Providing the byte caching in a base station enables it to become part of the context management. The UE takes advantage of byte caching depending on the capabilities of the base station to which it connects as it moves Implementing byte caching in the base station does not require changes to the UE. Negotiations are carried out between the base station and the byte cache server such that the UE can maintain a continuous session taking advantage of the byte caching when available at a base station.

As will be appreciated by one skilled in the art, aspects of the present invention may be embodied as a system, method, computer program product or computer program. Accordingly, aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). Java and all Java-based trademarks and logos are trademarks or registered trademarks of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

For the avoidance of doubt, the term "comprising", as used herein throughout the description and claims is not to be construed as meaning "consisting only of".

What is claimed:

1. A method for optimization of mobile data communication, comprising:
   intercepting, by a first base station in a first network administered by a first entity, a synchronous data communication session between a user equipment in the first network and an endpoint server in a second network administered by a second entity, wherein the synchronous data communication session is established by a first communication protocol; and
   implementing byte caching at the first base station to optimize data transfer between the first base station and a byte cache server located in the first network at a network peering point between the first network and the second network, wherein data transfer between the first base station and the byte cache server is optimized by:
      receiving, from the first base station, a signal indicating that the first base station implements byte caching,
      identifying, by the byte cache server in response to receiving the signal, synchronization header data and payload data in a data packet transmitted from the endpoint server to the user equipment in the synchronous data communication session using the first communication protocol,
      transmitting, from the byte cache server to the first base station using a second communication protocol, a byte cache record having the synchronization header data and a byte cache symbol corresponding to the payload data,
      receiving, by the first base station, the byte cache record,
      regenerating, by the first base station, the data packet using the received byte cache record, and
      transmitting the regenerated first data packet to the user equipment.

2. The method as claimed in claim 1, wherein the first communication protocol is a synchronous communication protocol and the second communication protocol is an asynchronous communication protocol.

3. The method as claimed in claim 1, further comprising:
   intercepting, by a second base station in the first network, the synchronous data communication session;
   determining, by the byte cache server, that the second base station does not implement byte caching;
   providing, in response to determining that the second base station does not implement byte caching, the byte cache server as a transparent proxy with byte caching functionality where traffic for the user equipment is no longer tunneled.

4. The method as claimed in claim 1, wherein implementing byte caching at the first base station manipulates the synchronous data communication session without terminating it.

5. The method as claimed in claim 1, wherein the byte cache server examines data in a data communication to the user equipment and populates a byte cache structure.

6. The method as claimed in claim 1, wherein the first communication protocol is a Transmission Control Protocol (TCP) and the second communication protocol is a User Datagram Protocol (UDP).

7. The method as claimed in claim 6, further comprising:
providing, by the first base station, the signal by modifying a Transmission Control Protocol (TCP) header of a TCP packet of the synchronized data communication session to insert a marker TCP option into an options field in the TCP header.

8. The method as claimed in claim 6, further comprising:
providing, by the first base station, the signal by modifying an Internet Protocol header of TCP packets of the synchronized data communication session.

9. The method as claimed in claim 1, wherein the byte cache record relates to one or more segments of data in one or more data packets.

10. The method as claimed in claim 1, further comprising:
generating a fake communication socket at the first base station which mimics a behavior and a state of a communication socket in the byte cache server.

11. The method as claimed in claim 10, wherein the fake socket is a TCP socket, and wherein the fake socket and the socket in the byte cache server are operated to have synchronized TCP sequence numbers.

12. The method as claimed in claim 10, wherein the fake socket is inserted in an established transfer protocol state.

13. The method as claimed in claim 3, further comprising:
transferring the user equipment from the first base station to the second base station at a first time without terminating the synchronous data communication session; and
transferring the user equipment from the second base station to the first base station at a second time without terminating the synchronous data communication session.

14. A system for optimization of mobile data communication, comprising:
one or more computing nodes having a memory and a processor; and
a non-transitory computer readable storage medium of the one or more computing nodes having program instructions embodied therewith, the program instructions executable by the processor to cause the system to:
intercept, at a first base station in a first network administered by a first entity, a synchronous data communication session between a user equipment in the first network and an endpoint server in a second network administered by a second entity, wherein the synchronous data communication session is established by a first communication protocol; and
implement byte caching at the first base station to optimize data transfer between the first base station and a byte cache server located in the first network at a network peering point between the first network and the second network, wherein data transfer between the first base station and the byte cache server is optimized by executing operations to:
receive, from the first base station, a signal indicating that the first base station implements byte caching,
identify, at the byte cache server in response to receiving the signal, synchronization header data and payload data in a data packet transmitted from the endpoint server to the user equipment in the synchronous data communication session using the first communication protocol,
transmit, from the byte cache server to the first base station using a second communication protocol, a byte cache record having the synchronization header data and a byte cache symbol corresponding to the payload data,
receive, at the first base station, the byte cache record,
regenerate, at the first base station, the data packet using the received byte cache record, and
transmit the regenerated data packet to the user equipment.

15. The system as claimed in claim 14, wherein the program instructions executable by the processor further cause the system to:
intercept, at a second base station in the first network, the synchronous data communication session;
determine, at the byte cache server, that the second base station does not implement byte caching; and
provide, in response to determining that the second base station does not implement byte caching, the byte cache server as a transparent proxy with byte caching functionality where traffic for the user equipment is no longer tunneled.

16. The system as claimed in claim 14, wherein the program instructions executable by the processor further cause the system to implement byte caching at the first base station implements byte caching in the synchronous data communication session without terminating it.

17. The system as claimed in claim 14, wherein the byte cache server includes a byte cache structure, and the program instructions executable by the processor further cause the system to examine data in the synchronous data communication session at the byte cache server and populate the byte cache structure based on the examination.

18. The system as claimed in claim 14, wherein the program instructions executable by the processor further cause the system to generate a fake communication socket at the first base station which mimics a behavior and a state of a communication socket in the byte cache server.

19. The system as claimed in claim 14, wherein a sub-set of base stations for a mobile communication network implements byte caching.

20. The system as claimed in claim 14, wherein the first network is a 3G network.

* * * * *